United States Patent
Sato et al.

(10) Patent No.: US 9,611,886 B2
(45) Date of Patent: Apr. 4, 2017

(54) TILTING PAD BEARING

(71) Applicant: MITSUBISHI HITACHI POWER SYSTEMS, LTD., Yokohama (JP)

(72) Inventors: Motoki Sato, Tokyo (JP); Kenta Suzuki, Tokyo (JP); Makoto Hemmi, Tokyo (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 0 days.

(21) Appl. No.: 14/962,453

(22) Filed: Dec. 8, 2015

(65) Prior Publication Data

US 2016/0169275 A1 Jun. 16, 2016

(30) Foreign Application Priority Data

Dec. 10, 2014 (JP) .................................. 2014-249783

(51) Int. Cl.
| | | |
|---|---|---|
| F16C 17/10 | (2006.01) | |
| F16C 17/03 | (2006.01) | |
| F16C 33/10 | (2006.01) | |
| F16C 17/06 | (2006.01) | |

(52) U.S. Cl.
CPC .............. *F16C 17/03* (2013.01); *F16C 33/10* (2013.01); *F16C 33/106* (2013.01); *F16C 33/108* (2013.01); *F16C 33/1045* (2013.01); *F16C 33/1085* (2013.01); *F16C 17/06* (2013.01)

(58) Field of Classification Search
CPC .................................. F16C 17/03; F16C 17/06
See application file for complete search history.

(56) References Cited

U.S. PATENT DOCUMENTS

| | | | | | |
|---|---|---|---|---|---|
| 3,454,312 A | * | 7/1969 | Bielec | ..................... | F16C 17/06 384/307 |
| 3,814,487 A | * | 6/1974 | Gardner | .............. | F16C 32/0692 384/307 |
| 5,547,287 A | * | 8/1996 | Zeidan | .................. | F16C 33/108 384/114 |
| 6,588,933 B2 | * | 7/2003 | Ferguson | ................ | F16C 17/04 384/122 |
| 2013/0330030 A1 | | 12/2013 | Suzuki et al. | | |

FOREIGN PATENT DOCUMENTS

| | | |
|---|---|---|
| JP | 2009-30704 A | 2/2009 |
| JP | 2009-063015 A | 3/2009 |
| WO | 2012/114445 A1 | 8/2012 |

OTHER PUBLICATIONS

Extended European Search Report received in corresponding European Application No. 15199083.5 dated Feb. 10, 2016.

* cited by examiner

*Primary Examiner* — Thomas R. Hannon
(74) *Attorney, Agent, or Firm* — Mattingly & Malur, PC (57) ABSTRACT

Provided is a tilting pad bearing capable of suppressing the temperature rise of sliding surfaces of pads and reducing the amount of oil that has to be supplied to the bearing. The tilting pad bearing comprises: a bearing housing 4; a plurality of pads 2 which are arranged to be pivotable with respect to the bearing housing 4; a channel 31 which is formed in each of the pads 2; a first nozzle 9 which is formed in each of the pads 2, connects with the channel 31, and is open on a rear end surface 8 of the pad 2; and a second nozzle 10 which is formed in each of the pads 2, connects with the channel 31, and is open on a rear edge part of a sliding surface 5 of the pad 2.

3 Claims, 8 Drawing Sheets

TILTING PAD BEARING

BACKGROUND OF THE INVENTION

1. Field of the Invention

The present invention relates to a tilting pad bearing.

2. Description of the Related Art

The fluid bearing (liquid bearing) is a shaft bearing that supports the load of a rotary shaft via a thin fluid film. The fluid bearings have higher load bearing performance compared to rolling bearings and also excel in vibration damping properties. Therefore, the fluid bearings are widely employed for industrial large-sized rotary machines (steam turbines, generators, etc.) required to have high reliability. As a type of the fluid bearing, there exists a tilting pad bearing excelling in oscillation stability.

The tilting pad bearing comprises a bearing housing and a plurality of pads which are arranged to be pivotable (tiltable) with respect to the bearing housing. Lubricating oil is supplied to the gaps between the rotary shaft and the pads to form oil films, and the rotary shaft is supported by the pressure of the oil films. Since the tilting angle of each pad changes according to the pressure distribution of the oil film, unstable oscillation such as the so-called "oil whip" can be suppressed.

A direct oil supply method is well known as one of the oil supply methods for the tilting pad bearing. In the standard type of direct oil supply method, the lubricating oil is supplied to the gap between the rotary shaft and the sliding surface of each pad from an oil supply hole that is open on a front edge part of the sliding surface of the pad, or the lubricating oil is supplied from each oil supply nozzle arranged between adjacent pads to the gap between the rotary shaft and the sliding surface of the pad situated downstream of the oil supply nozzle. With these methods directly supplying low-temperature lubricating oil to the gaps between the rotary shaft and the sliding surfaces of the pads, the temperature rise of the sliding surfaces of the pads can be suppressed. Consequently, the amount of oil supply can be reduced.

There is another known method (see JP-2009-063015-A, for example) in which the lubricating oil is supplied via an oil channel (cooling channel) formed inside each pad to the gap between the rotary shaft and the sliding surface of the adjacent pad. In this method, low-temperature lubricating oil is first distributed to the oil channel of each pad and then supplied to the gap between the rotary shaft and the sliding surface of the next pad on the downstream side. Therefore, the temperature rise of the sliding surfaces of the pads can be suppressed further compared to the standard type of direct oil supply method. Consequently, the amount of oil supply can be reduced further.

SUMMARY OF THE INVENTION

However, the conventional technology described above still has room for improvement. In general, the lubricating oil supplied to the gap between the rotary shaft and the sliding surface of each pad is heated due to the shearing force up to a high temperature. Part of the high-temperature lubricating oil is dragged around by the rotary shaft, passes through the rear edge part of the sliding surface of the pad, and then flows into the front edge part of the sliding surface of the next pad on the downstream side (the so-called "hot oil carry-over"). This is a factor causing a temperature rise of the sliding surfaces of the pads.

The object of the present invention is to provide a tilting pad bearing capable of suppressing the temperature rise of the sliding surfaces of the pads and reducing the amount of oil that has to be supplied to the bearing.

To achieve the above object, a tilting pad bearing according to the present invention comprises: a bearing housing; a plurality of pads which are arranged to be pivotable with respect to the bearing housing; an oil channel which is formed in each of the pads to cool down at least a rear end part of the pad; a first nozzle which is formed in each of the pads, connects with the oil channel, and is open on a rear end surface of the pad; and a second nozzle which is formed in at least one of the pads, connects with the oil channel, and is open on a rear edge part of a sliding surface of the pad.

In the tilting pad bearing according to the present invention configured as above, low-temperature lubricating oil is first distributed to the oil channel of each pad (on the upstream side) and then part of the lubricating oil is supplied via the first nozzle to the gap between the rotary shaft and the sliding surface of the next pad on the downstream side. Therefore, the temperature rise of the sliding surfaces of the pads can be suppressed. Further, since the rest of the lubricating oil is supplied via the second nozzle to the gap between the rotary shaft and the rear edge part of the sliding surface of the pad (on the upstream side), the temperature rise of the sliding surfaces of the pads can be suppressed further. Specifically, the lubricating oil supplied from the second nozzle not only cools down the rotary shaft and the rear edge part of the sliding surface of the pad (on the upstream side) but also promotes the flow for discharging the oil sideways from the rear edge part of the sliding surface of the pad (on the upstream side). Thus, the high-temperature lubricating oil (heated lubricating oil) can be prevented from passing through the rear edge part of the sliding surface of the pad (on the upstream side) and flowing into the front edge part of the sliding surface of the next pad on the downstream side. Consequently, the temperature rise of the sliding surfaces of the pads can be suppressed and the amount of oil that has to be supplied to the bearing can be reduced.

According to the present invention, the temperature rise of the sliding surfaces of the pads can be suppressed and the amount of oil that has to be supplied to the bearing can be reduced.

DESCRIPTION OF THE PREFERRED EMBODIMENTS

A first embodiment of the present invention will be described below with reference to figures.

Figure 1:
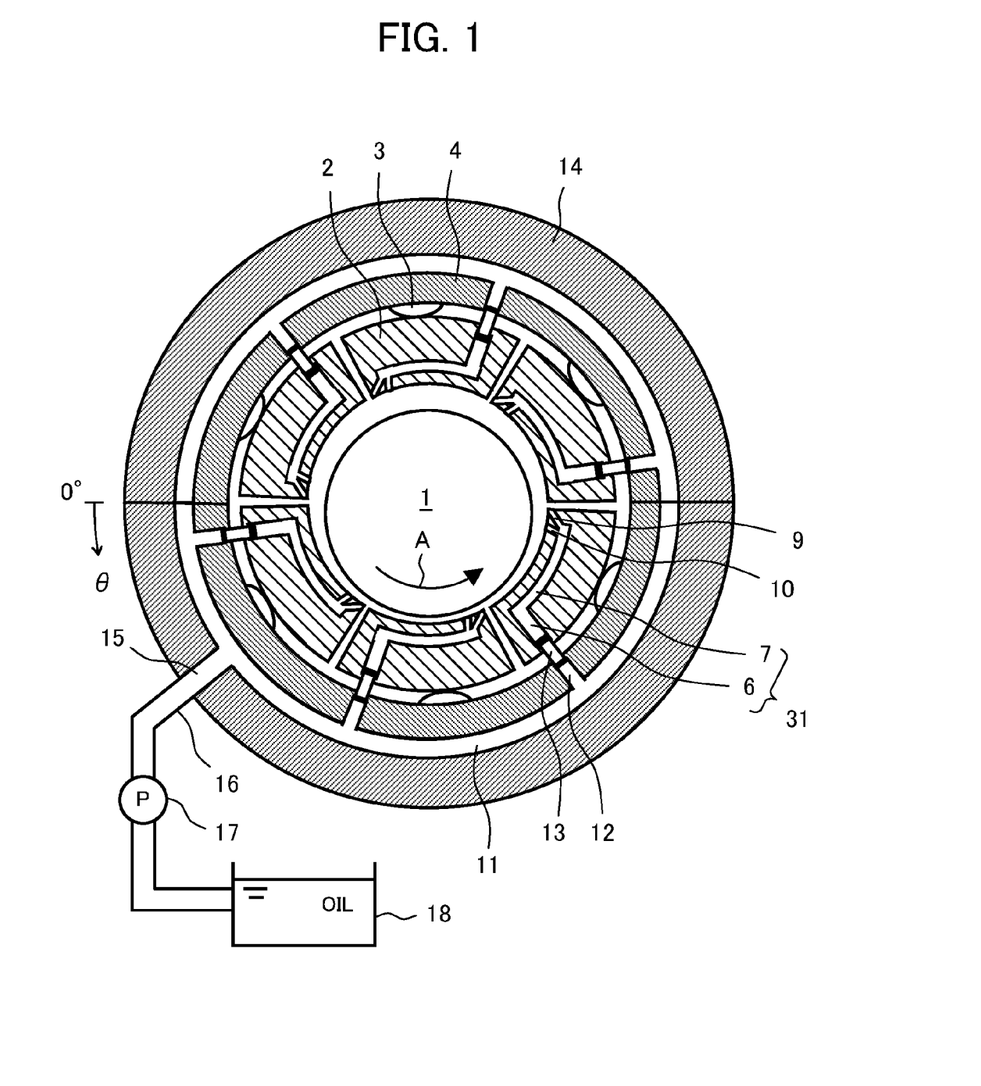
FIG. 1 is a circumferential cross-sectional view showing the structure of a tilting pad bearing according to a first embodiment of the present invention.
Figure 2:
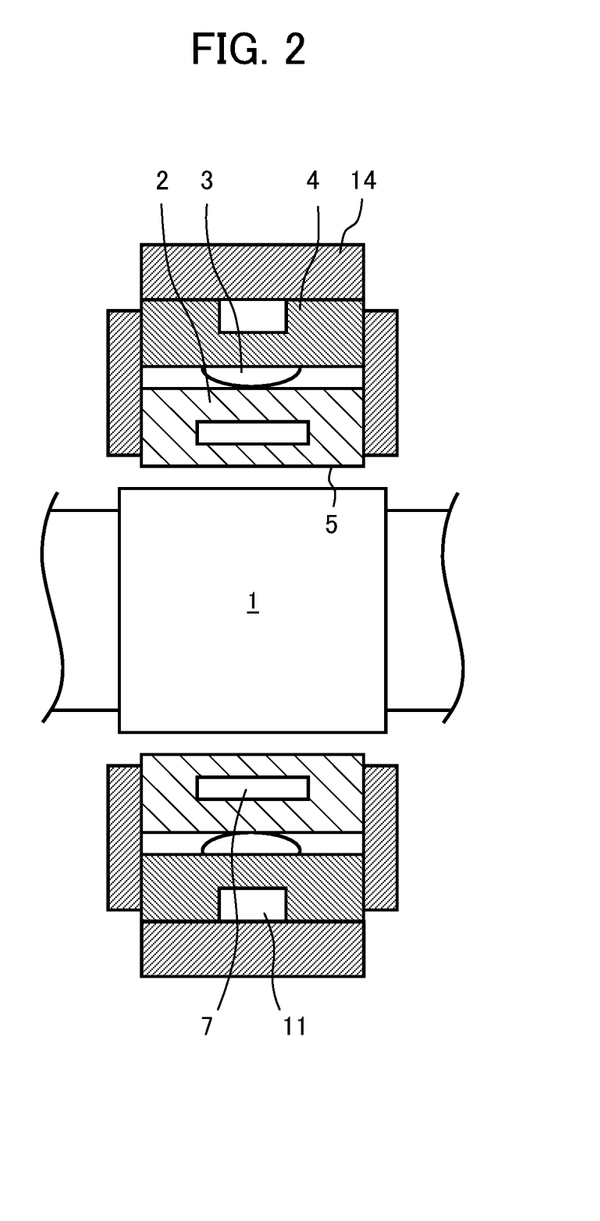
FIG. 2 is an axial cross-sectional view showing the structure of the tilting pad bearing according to the first embodiment of the present invention.
Figure 3:
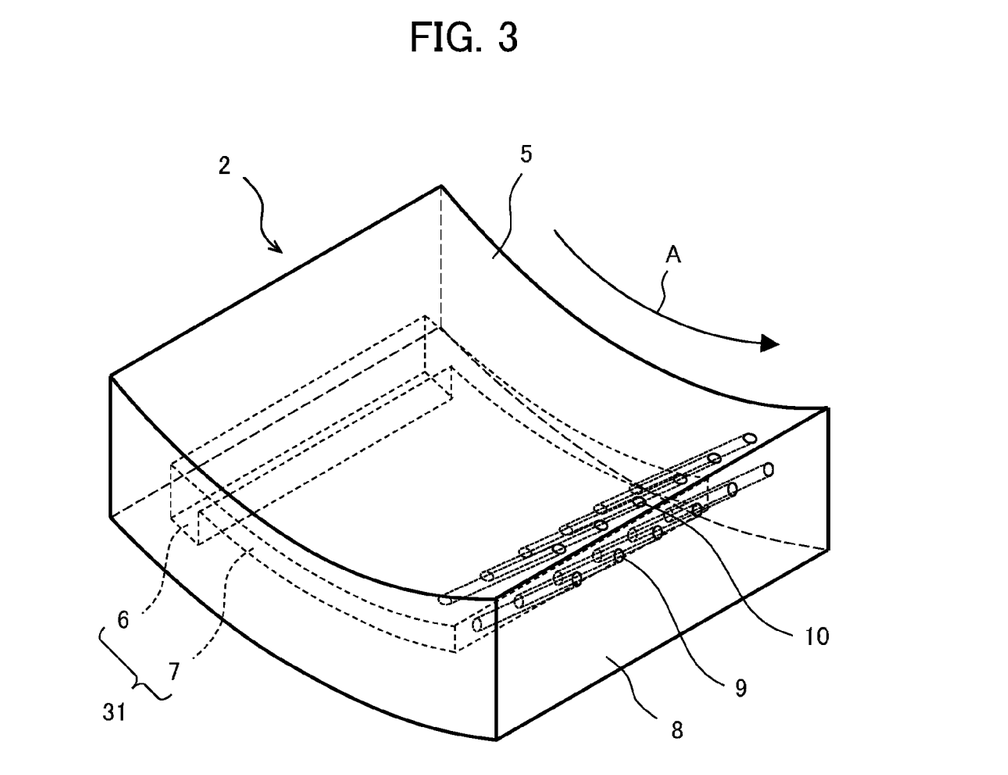
FIG. 3 is a perspective view showing the structure of a pad in the first embodiment of the present invention.

FIG. 1 is a circumferential cross-sectional view showing the structure of a tilting pad bearing according to a first embodiment of the present invention. FIG. 2 is an axial cross-sectional view showing the structure of the tilting pad bearing according to this embodiment. FIG. 3 is a perspective view showing the structure of a pad in this embodiment.

The tilting pad bearing in this embodiment is a journal bearing for supporting the radial-direction load of a rotary shaft 1. The bearing comprises a plurality of (six in this embodiment) journal pads 2 which are arranged in the circumferential direction of the rotary shaft 1 to face the peripheral surface of the rotary shaft 1 and a bearing housing 4 which supports the pads 2 in a pivotable (tiltable) manner via a plurality of (six in this embodiment) pivots 3. In this embodiment, the rotary shaft 1 extends in a horizontal direction and rotates in the rotational direction indicated by the arrow A in FIG. 1

The sliding surface (inner-circumferential surface) 5 of each pad 2 is formed of metal having a low melting point (e.g., white metal). On the front edge side (i.e., upstream side in the rotational direction A of the rotary shaft 1) of each pad 2, a radial-direction channel 6 extending in the radial direction is formed to be open on the back surface (outer-circumferential surface) of the pad 2. Inside each pad 2, a circumferential-direction channel 7 connecting with the radial-direction channel 6 and extending in the circumferential direction is formed. The channels 6 and 7 constitute an oil channel 31 formed in each pad 2. Incidentally, each channel 6, 7 in this embodiment has a wide and rectangular cross-sectional shape.

On the rear edge side (i.e., downstream side in the rotational direction A of the rotary shaft 1) of each pad 2, a plurality of (six in this embodiment) first nozzles 9 connecting with the circumferential-direction channel 7 and extending inward in regard to the radial direction are formed to be open on a rear end surface 8 of the pad 2. Further, on the rear edge side of each pad 2, a plurality of (six in this embodiment) second nozzles 10 connecting with the circumferential-direction channel 7 and extending inward in regard to the radial direction are formed to be open on a rear edge part of the sliding surface 5 of the pad 2. Incidentally, each nozzle 9, 10 in this embodiment has a circular cross-sectional shape.

On the peripheral side of the bearing housing 4, an oil guide groove 11 is formed to extend circumferentially. Through the bearing housing 4, oil guide holes 12 extending from the oil guide groove 11 to penetrate the bearing housing 4 in the radial direction are formed corresponding to the radial-direction channels 6 of the pads 2. The oil guide holes 12 of the bearing housing 4 and the corresponding radial-direction channels 6 of the pads 2 are connected to each other via oil guide pipes 13 that are stretchable or flexible. The oil guide groove 11 of the bearing housing 4 is connected to an oil tank 18 via an oil guide hole 15 of a casing 14, a pipe 16, and a pump 17.

By driving the pump 17, lubricating oil stored in the oil tank 18 is supplied to the oil guide groove 11 of the bearing housing 4, and further to the radial-direction channel 6 of each pad 2 via the oil guide hole 12 of the bearing housing 4 and the oil guide pipe 13. Accordingly, low-temperature lubricating oil is first distributed to the channels 6 and 7 of each pad 2 (on the upstream side) and then part of the lubricating oil is supplied via the first nozzle 9 to the gap between the rotary shaft 1 and the sliding surface 5 of the next pad 2 on the downstream side. The rest of the lubricating oil is supplied via the second nozzle 10 to the gap between the rotary shaft 1 and the rear edge part of the sliding surface 5 of the pad 2 (on the upstream side).

Figure 4:
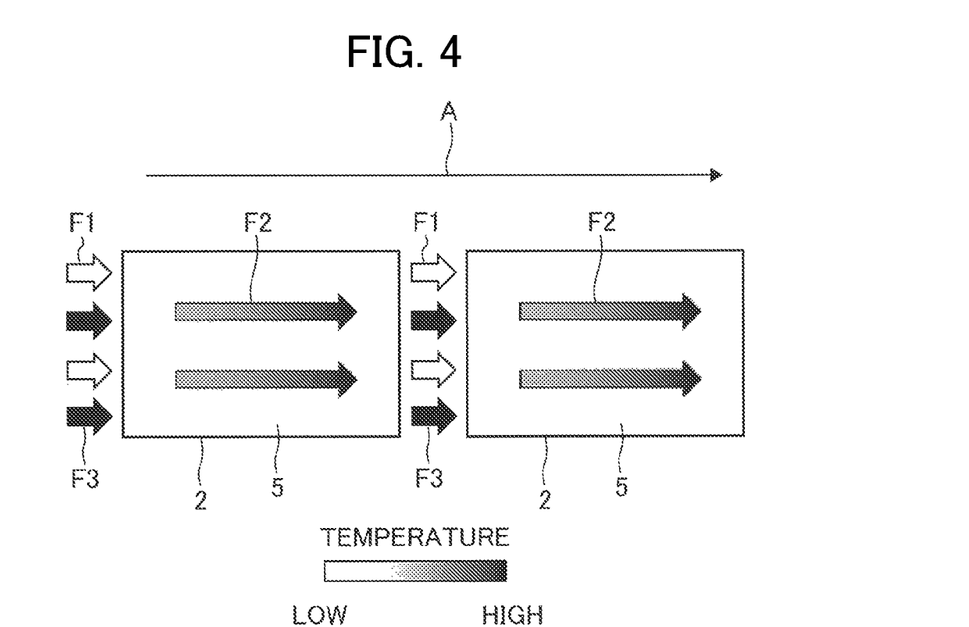
FIG. 4 is a developed view of the sliding surfaces showing the oil flow on the pad sliding surfaces in a comparative example.
Figure 5:
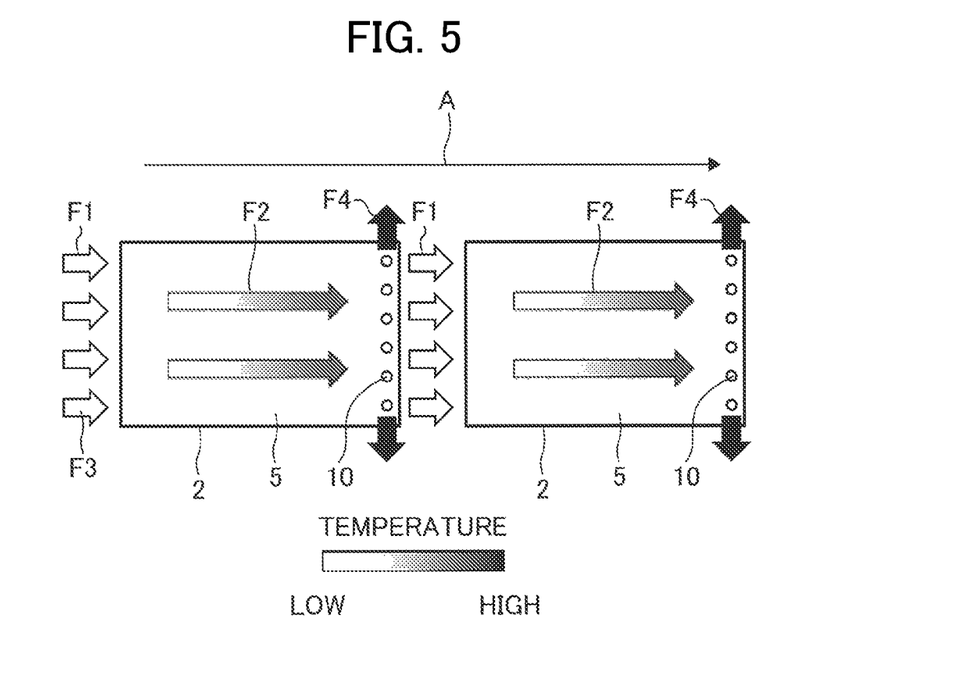
FIG. 5 is a developed view of the sliding surfaces showing the oil flow on the pad sliding surfaces in the first embodiment of the present invention.
Figure 6:
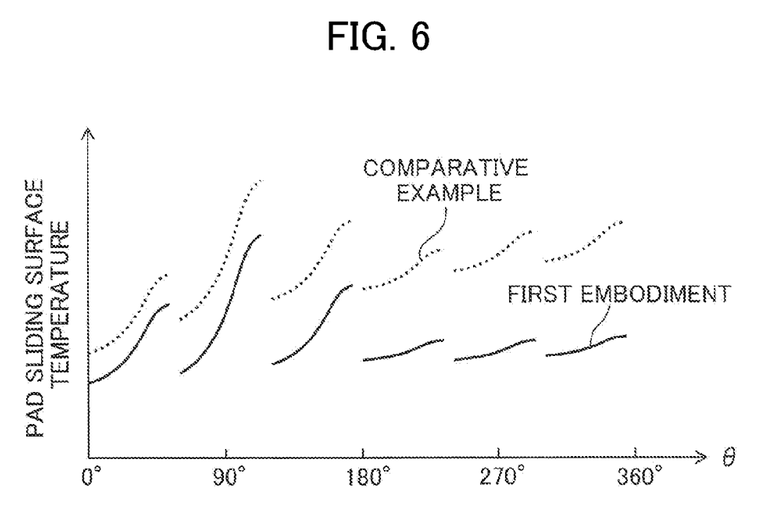
FIG. 6 is a graph showing the temperature distribution on the pad sliding surfaces in the comparative example and the first embodiment of the present invention

Next, the effects of this embodiment will be explained below by using a comparative example (in which no second nozzle 10 is formed). FIG. 4 is a developed view of the sliding surfaces showing the oil flow on the pad sliding surfaces in the comparative example. FIG. 5 is a developed view of the sliding surfaces showing the oil flow on the pad sliding surfaces in this embodiment. FIG. 6 is a graph showing the temperature distribution on the pad sliding surfaces in the comparative example and this embodiment.

In the comparative example, low-temperature lubricating oil is supplied from the first nozzle 9 of each pad 2 to the gap between the rotary shaft 1 and the sliding surface 5 of the next pad 2 on the downstream side (see arrows F1). The lubricating oil supplied to the gap between the rotary shaft 1 and the sliding surface 5 of each pad 2 forms an oil film and the rotary shaft 1 is supported by the pressure of the oil film. However, the lubricating oil is heated due to the shearing force up to a high temperature (see arrows F2). Part of the high-temperature lubricating oil (heated lubricating oil) is dragged around by the rotary shaft 1, passes through the rear edge part of the sliding surface 5 of the pad 2, and then flows into the front edge part of the sliding surface 5 of the next pad 2 on the downstream side (see arrows F3). Thus, the front edge part of the sliding surface 5 of each pad 2 is supplied with not only the low-temperature lubricating oil from the first nozzle 9 of the pad 2 on the upstream side but also the high-temperature lubricating oil from the sliding surface 5 of the pad 2 on the upstream side. As a result, the temperature of the lubricating oil rises.

In contrast, in this embodiment, low-temperature lubricating oil is supplied from the second nozzle 10 of each pad 2 to the gap between the rotary shaft 1 and the rear edge part of the sliding surface 5 of the pad 2. The low-temperature lubricating oil supplied from the second nozzle 10 not only cools down the rotary shaft 1 and the rear edge part of the sliding surface 5 of the pad 2 but also promotes the flow for discharging the oil sideways (upward and downward in FIG. 5) from the rear edge part of the sliding surface 5 of the pad 2 (see arrows F4). Thus, the high-temperature lubricating oil (heated lubricating oil) can be prevented from passing through the rear edge part of the sliding surface 5 of the pad 2 and flowing into the front edge part of the sliding surface 5 of the next pad 2 on the downstream side. Consequently, the temperature rise of the lubricating oil in the front edge part of the sliding surface 5 of each pad 2 can be suppressed.

Therefore, under the condition that the amount of oil supplied to each bearing is the same, this embodiment is capable of suppressing the temperature rise of the pad, sliding surfaces in comparison with the comparative example as shown in FIG. 6. Further, in comparison with the comparative example, this embodiment is capable of reducing the amount of oil supply necessary for lowering the temperature of the pad sliding surfaces.

Figure 7:
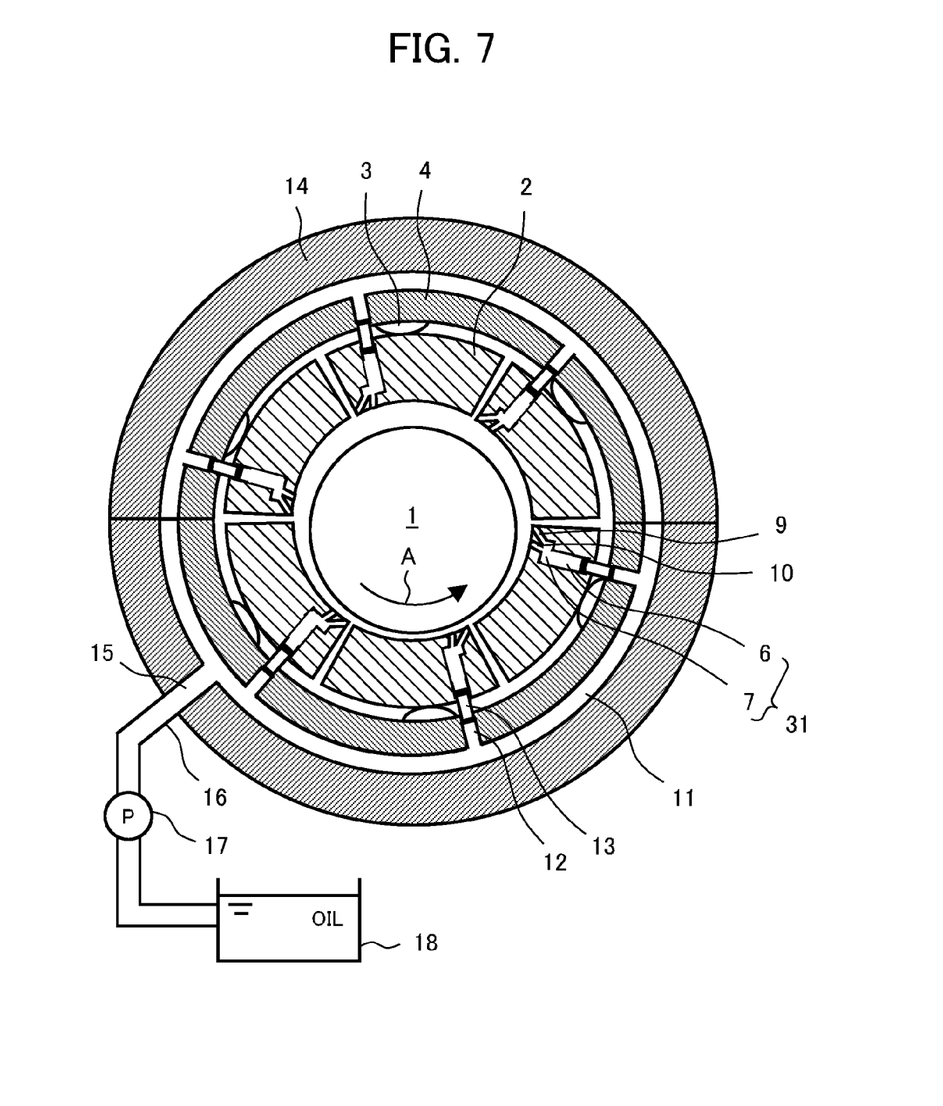
FIG. 7 is a circumferential cross-sectional view showing the structure of a tilting pad bearing as a modification according to the present invention.

Incidentally, while the above description of the first embodiment has been given by using an example in which the oil channel 31 (i.e. the channels 6 and 7) of each pad 2 is formed so as to cool down the entire pad 2 from its front end part to its rear end part, the design of the oil channel 31 is not limited to this example and can be modified without departing from the subject matter and technical idea of the present invention. For example, as shown in FIG. 7, it is also possible to form the oil channel 31 of each pad 2 exclusively in the rear end part of the pad 2 so as to exclusively cool down the pad's rear end part which tends to be heated to a relatively high temperature.

While the above description of the first embodiment has been given by using an example in which a plurality of first nozzles 9 are formed in each pad 2, it is also possible to form only one first nozzle 9 in each pad 2. Similarly, while a plurality of second nozzles 10 are formed in each pad 2 in the above description of the first embodiment, it is also possible to form only one second nozzle 10 in each pad 2.

While the above description of the first embodiment has been given by using an example in which the second nozzle 10 is formed in every pad 2, the arrangement of the second nozzles 10 is not limited to this example and can be modified without departing from the subject matter and technical idea of the present invention. Specifically, it is also possible to form the second nozzle 10 in at least one pad 2 that tends to be heated to a relatively high temperature, without forming the second nozzle 10 in the other pads 2.

Although not particularly explained in the above first embodiment, it is possible to form an inclined part in a front edge region of the sliding surface 5 of each pad 2 to facilitate the inflow of the lubricating oil via the front edge region of the sliding surface 5 of the pad 2. It is also possible to form inclined parts in side edge regions of the sliding surface 5 of each pad 2 to facilitate the outflow of the lubricating oil via the side edge regions of the sliding surface 5 of the pad 2.

A second embodiment of the present invention will be described below with reference to figures.

Figure 8:
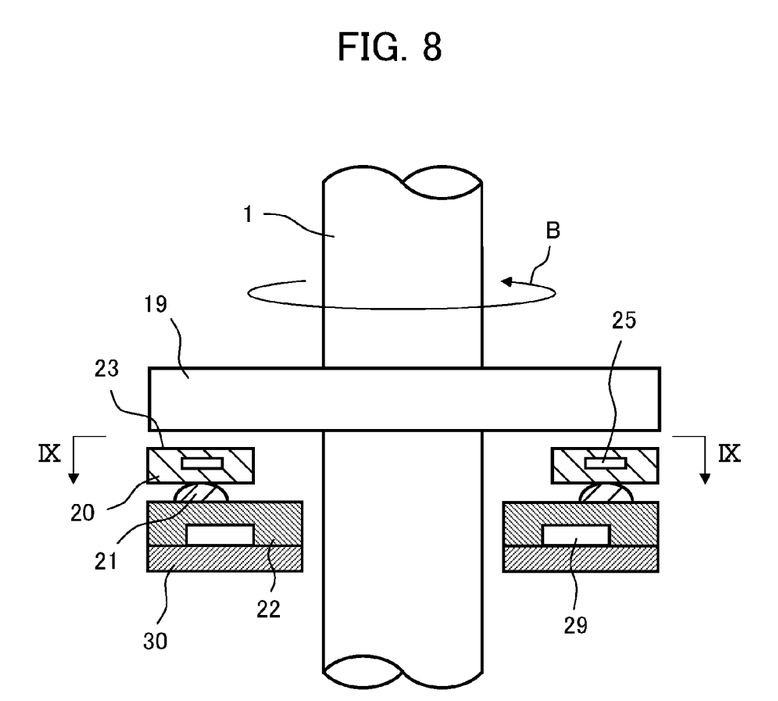
FIG. 8 is an axial cross-sectional view showing the structure of a tilting pad bearing according to a second embodiment of the present invention.
Figure 9:
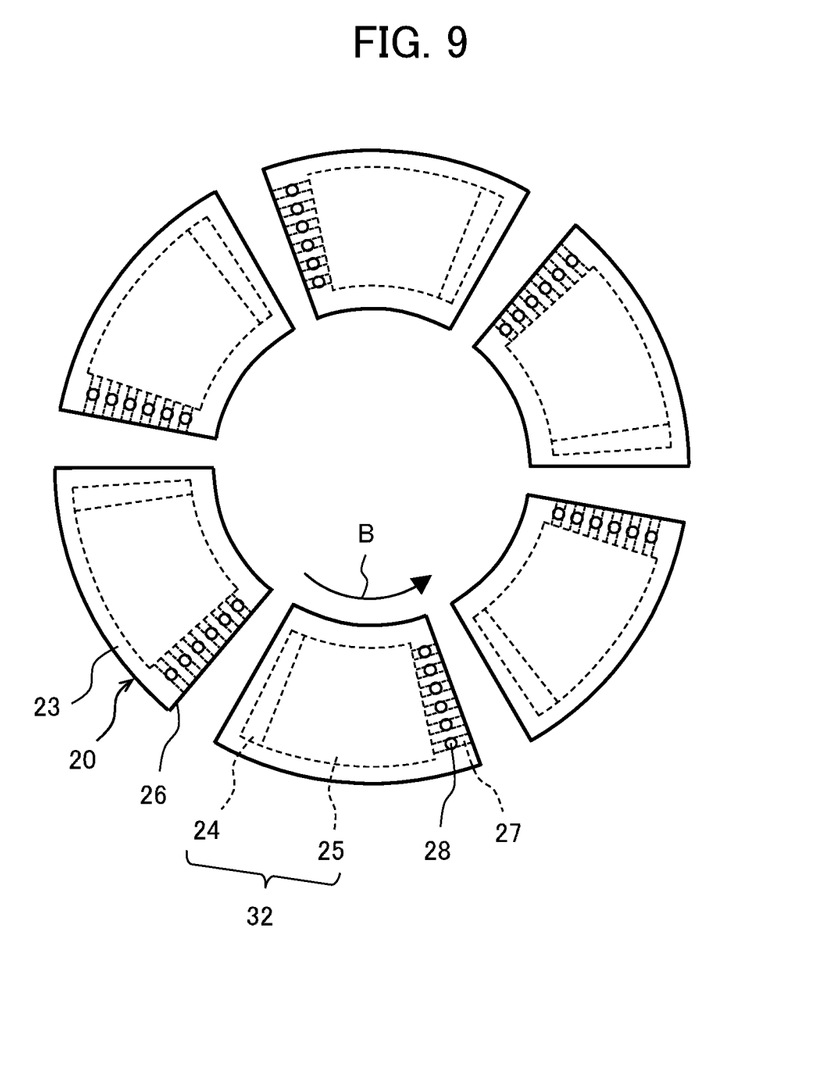
FIG. 9 is a circumferential cross-sectional view taken along the cross section IX-IX in FIG. 8 and showing the structure of pads.

FIG. 8 is an axial cross-sectional view showing the structure of a tilting pad bearing according to this embodiment. FIG. 9 is a circumferential cross-sectional view taken along the cross section IX-IX in FIG. 8 and showing the structure of thrust pads.

The tilting pad bearing in this embodiment is a thrust bearing for supporting the axial-direction load of a rotary shaft 1. The bearing comprises a plurality of (six in this embodiment) thrust pads 20 which are arranged in the circumferential direction of the rotary shaft 1 to face a runner part 19 of the rotary shaft 1 and a bearing housing 22 which supports the pads 20 in a pivotable (tiltable) manner via a plurality of (six in this embodiment) pivots 21.

The sliding surface 23 of each pad 20 is formed of metal having a low melting point (e.g., white metal). On the front edge side (i.e., upstream side in the rotational direction B of the rotary shaft 1) of each pad 20, an axial-direction channel 24 extending in the axial direction is formed to be open on the back surface of the pad 20. Inside each pad 20, a circumferential-direction channel 25 connecting with the axial-direction channel 24 and extending in the circumferential direction is formed. The channels 24 and 25 constitute an oil channel 32 formed in each pad 2. Incidentally, each channel 24, 25 in this embodiment has a wide and rectangular cross-sectional shape.

On the rear edge side (i.e., downstream side in the rotational direction B of the rotary shaft 1) of each pad 20, a plurality of (six in this embodiment) first nozzles 27 connecting with the circumferential-direction channel 25 and extending toward one side in regard to the axial direction (the rotary shaft's side and the front side of the sheet of FIG. 9) are formed to be open on a rear end surface 26 of the pad 20. Further, on the rear edge side of each pad 20, a plurality of (six in this embodiment) second nozzles 28 connecting with the circumferential-direction channel 25 and extending toward one side in regard to the axial direction are formed to be open on a rear edge part of the sliding surface 23 of the pad 20. Incidentally, each nozzle 27, 28 in this embodiment has a circular cross-sectional shape.

On the bearing housing 22, an oil guide groove 29 is formed to extend circumferentially. Through the bearing housing 22, oil guide holes (unshown) extending from the oil guide groove 29 to penetrate the bearing housing 22 in the axial direction are formed corresponding to the axial-direction channels 24 of the pads 20. The oil guide holes of the bearing housing 22 and the corresponding axial-direction channels 24 of the pads 20 are connected to each other via oil guide pipes (unshown) that are stretchable or flexible. The oil guide groove 29 of the bearing housing 22 is connected to an oil tank (unshown) via an oil guide hole (unshown) of a casing 30, a pipe (unshown) and a pump (unshown).

By driving the pump, lubricating oil stored in the oil tank is supplied to the oil guide groove 29 of the bearing housing 22, and further to the axial-direction channel 24 of each pad 20 via the oil guide hole of the bearing housing 22 and the oil guide pipe. Accordingly, low-temperature lubricating oil is first distributed to the channels 24 and 25 of each pad 20 (on the upstream side) and then part of the lubricating oil is supplied via the first nozzle 27 to the gap between the rotary shaft 1 and the sliding surface 23 of the next pad 20 on the downstream side. The rest of the lubricating oil is supplied via the second nozzle 28 to the gap between the rotary shaft 1 and the rear edge part of the sliding surface 23 of the pad 20 (on the upstream side).

Also in this embodiment configured as above, the temperature rise of the sliding surfaces of the pads can be suppressed and the amount of oil that has to be supplied to the bearing (the amount of oil supply) can be reduced similarly to the first embodiment.

Incidentally, while the above description of the second embodiment has been given by using an example in which the oil channel 32 (i.e. the channels 24 and 25) of each pad 20 is formed so as to cool down the entire pad 20 from its front end part to its rear end part, the design of the the oil channel 32 is not limited to this example and can be modified without departing from the subject matter and technical idea of the present invention. Specifically, it is also possible to form the oil channel 32 of each pad 20 exclusively in the rear end part of the pad 20 so as to exclusively cool down the pad's rear end part which tends to be heated to a relatively high temperature.

While the above description of the second embodiment has been given by using an example in which a plurality of first nozzles 27 are formed in each pad 20, it is also possible to form only one first nozzle 27 in each pad 20. Similarly, while a plurality of second nozzles 28 are formed in each pad 20 in the above description of the second embodiment, it is also possible to form only one second nozzle 28 in each pad 20.

Although not particularly explained in the above second embodiment, it is possible to form an inclined part in a front edge region of the sliding surface 23 of each pad 20 to facilitate the inflow of the lubricating oil via the front edge region of the sliding surface 23 of the pad 20. It is also possible to form inclined parts in side edge regions of the sliding surface 23 of each pad 20 to facilitate the outflow of the lubricating oil via the side edge regions of the sliding surface 23 of the pad 20.

What is claimed is:

1. A tilting pad bearing comprising:
    a bearing housing;
    a plurality of pads in the bearing housing and which are arranged to be pivotable with respect to the bearing housing;
    an oil channel which is formed in each of the pads to cool down at least a rear end part of the pad;
    a first nozzle which is formed in each of the pads, which connects with the oil channel, which is open on a rear end surface of the pad and which supplies a flow of discharging oil to a sliding surface of a next pad at a downstream side; and
    a second nozzle which is formed in at least one of the pads, which connects with the oil channel, which is open on a rear edge part of a sliding surface of the pad and which promotes the flow of discharging oil sideways from the rear edge part of the sliding surface of the pad.

2. The tilting pad bearing according to claim 1, wherein the plurality of pads are arranged in a circumferential direction of a rotary shaft to face a peripheral surface of the rotary shaft and to receive a radial-direction load of the rotary shaft.

3. The tilting pad bearing according to claim 1, wherein the plurality of pads are arranged in a circumferential direction of a rotary shaft to face a runner part of the rotary shaft and to receive an axial-direction load of the rotary shaft.

* * * * *